(12) United States Patent
Koroglu et al.

(10) Patent No.: US 8,885,106 B2
(45) Date of Patent: *Nov. 11, 2014

(54) MULTI-TUNER USING INTERPOLATIVE DIVIDERS

(71) Applicant: Silicon Laboratories Inc., Austin, TX (US)

(72) Inventors: Mustafa H. Koroglu, Austin, TX (US); Abdulkerim L. Coban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/799,384

(22) Filed: Mar. 13, 2013

(65) Prior Publication Data

US 2014/0267925 A1    Sep. 18, 2014

(51) Int. Cl.
*H04N 5/44* (2011.01)
*H04N 5/50* (2006.01)
*H04N 5/46* (2006.01)

(52) U.S. Cl.
CPC ................................. *H04N 5/4401* (2013.01)
USPC ........................... 348/725; 348/731; 348/555

(58) Field of Classification Search
USPC ................. 348/731, 554–558, 725, 726, 836; 375/340, 316; 455/188.1, 190.1, 191.1, 455/193.2, 255, 256, 266, 313, 334, 337, 455/258
See application file for complete search history.

(56) References Cited

U.S. PATENT DOCUMENTS

| | | | |
|---|---|---|---|
| 4,654,884 A * | 3/1987 | Sakai et al. | 455/183.2 |
| 7,167,694 B2 | 1/2007 | Khoini-Poorfard et al. | |
| 7,417,510 B2 | 8/2008 | Huang | |
| 7,447,491 B2 | 11/2008 | Khoini-Poorfard | |
| 7,978,735 B2 * | 7/2011 | Ezra et al. | 370/493 |
| 8,145,170 B2 | 3/2012 | Khoini-Poorfard et al. | |
| 8,145,172 B2 | 3/2012 | Khoini-Poorfard et al. | |
| 8,548,037 B1 * | 10/2013 | Laurent-Michel | 375/232 |
| 2005/0266818 A1 * | 12/2005 | Johnson et al. | 455/260 |
| 2007/0011719 A1 * | 1/2007 | Lin | 725/139 |
| 2008/0165758 A1 * | 7/2008 | Kato et al. | 370/347 |
| 2010/0289967 A1 * | 11/2010 | Uchida | 348/735 |
| 2011/0151816 A1 | 6/2011 | Wu et al. | |
| 2011/0243563 A1 * | 10/2011 | Salinger et al. | 398/74 |

(Continued)

OTHER PUBLICATIONS

U.S. Appl. No. 13/799,351, filed Mar. 13, 2013 entitled, "A Television Tuner to Capture a Cable Spectrum," by Abdulkerim L. Coban, et al.

*Primary Examiner* — Victor Kostak
(74) *Attorney, Agent, or Firm* — Trop, Pruner & Hu, P.C.

(57) ABSTRACT

An apparatus includes a splitter to receive a radio frequency (RF) signal and to provide the RF signal to multiple channels of a tuner. Each channel may include an amplifier to amplify the RF signal, a mixer to downconvert the amplified RF signal to a second frequency signal using a local oscillator (LO) signal, where each of the channels is configured to receive a different LO signal, a filter to filter the downconverted second frequency signal, and a digitizer to digitize the downconverted second frequency signal. A clock generation circuit has multiple interpolative dividers and a frequency synthesizer to generate a reference clock signal. Each of the interpolative dividers is configured to receive the reference clock signal, generate a corresponding LO signal, and provide the corresponding LO signal to the mixer of at least one of the channels.

20 Claims, 8 Drawing Sheets

(56) References Cited

U.S. PATENT DOCUMENTS

2011/0244820 A1 10/2011 Khoini-Poorfard et al.
2012/0249888 A1* 10/2012 Naik et al. .................... 348/726
2012/0321012 A1* 12/2012 Elenes et al. .................. 375/285

* cited by examiner

MULTI-TUNER USING INTERPOLATIVE DIVIDERS

BACKGROUND

Televisions with multiple channel reception capabilities can provide desirable features such as picture-in-picture, recording one or more channels while watching another one, and fast channel switching time between a few adjacent channels or a few recently tuned channels. Typically, multiple tuners are provided to enable these capabilities. In general, these tuners are each implemented as a discrete tuner. While there have been efforts to implement a single tuner in a single semiconductor die integrated circuit (IC), it has proven difficult to incorporate more than one tuner on a single die, particularly in terms of area and power consumption, and performance issues.

SUMMARY OF THE INVENTION

In one embodiment, an apparatus includes a splitter to receive a radio frequency (RF) signal and to provide the RF signal to multiple channels of a tuner. Each such channel may include a first amplifier to amplify the RF signal, a mixer to downconvert the amplified RF signal to a second frequency signal using a local oscillator (LO) signal, where each of the channels is configured to receive a different LO signal, a first filter to filter the downconverted second frequency signal, a digitizer to digitize the downconverted second frequency signal.

In addition, the apparatus further includes a clock generation circuit having a frequency synthesizer to generate a reference clock signal and multiple interpolative dividers. Each of these interpolative dividers is configured to receive the reference clock signal, generate a corresponding LO signal, and provide the corresponding LO signal to the mixer of at least one of the channels.

The apparatus is a multi-tuner circuit configured on a single semiconductor die, in an embodiment. A controller may be coupled to the interpolative divider to control a value of the LO signal output by the interpolative divider to cause downconversion of the amplified RF signal to a narrowband signal substantially around DC. Note that the resolution of the interpolative divider may be limited to cause spurs generated in the interpolator divider to be maintained away from the LO signal.

In another embodiment, a system includes an integrated circuit (IC) multi-tuner circuit having a first semiconductor die including a first tuner to receive and process a RF signal to output a first digitized signal and a second tuner to receive and process the RF signal to output a second digitized signal. In addition, the IC may include or be coupled to a clock generation circuit having a single frequency synthesizer to generate a reference clock signal and multiple interpolative dividers. Each divider includes an interpolator having M-levels of resolution, where each of the interpolative dividers is to receive the reference clock signal and to generate a corresponding LO signal according to a fixed divide ratio and to provide the corresponding LO signal to one of the tuners. Note that each interpolator may be configured to operate as a M/2-level interpolator when a desired channel is a digital channel and as a M-level interpolator when the desired channel is an analog channel. The system may further include a demodulator coupled to receive and demodulate the digitized signals.

Yet another embodiment is directed to a method including configuring an interpolative divider of a clock generation circuit of a television tuner as a M/2-level interpolator responsive to a request to tune to a desired channel corresponding to a digital channel, controlling the interpolative divider to generate a LO signal from a reference clock signal according to a fixed divide ratio and providing the LO signal to a first tuner of a plurality of tuners of the television tuner. In turn, the RF signal may be downconverted in the first tuner using the LO signal and further processed.

Instead, responsive to a request to tune to a second desired channel corresponding to an analog channel, the interpolative divider may be configured as a M-level interpolator. More specifically, in an embodiment, the interpolative divider may be configured as the M-level divider if a downconverted signal from the analog channel would be substantially around DC. Otherwise the interpolative divider may be configured as the M/2-level interpolator.

DETAILED DESCRIPTION

Figure 1:
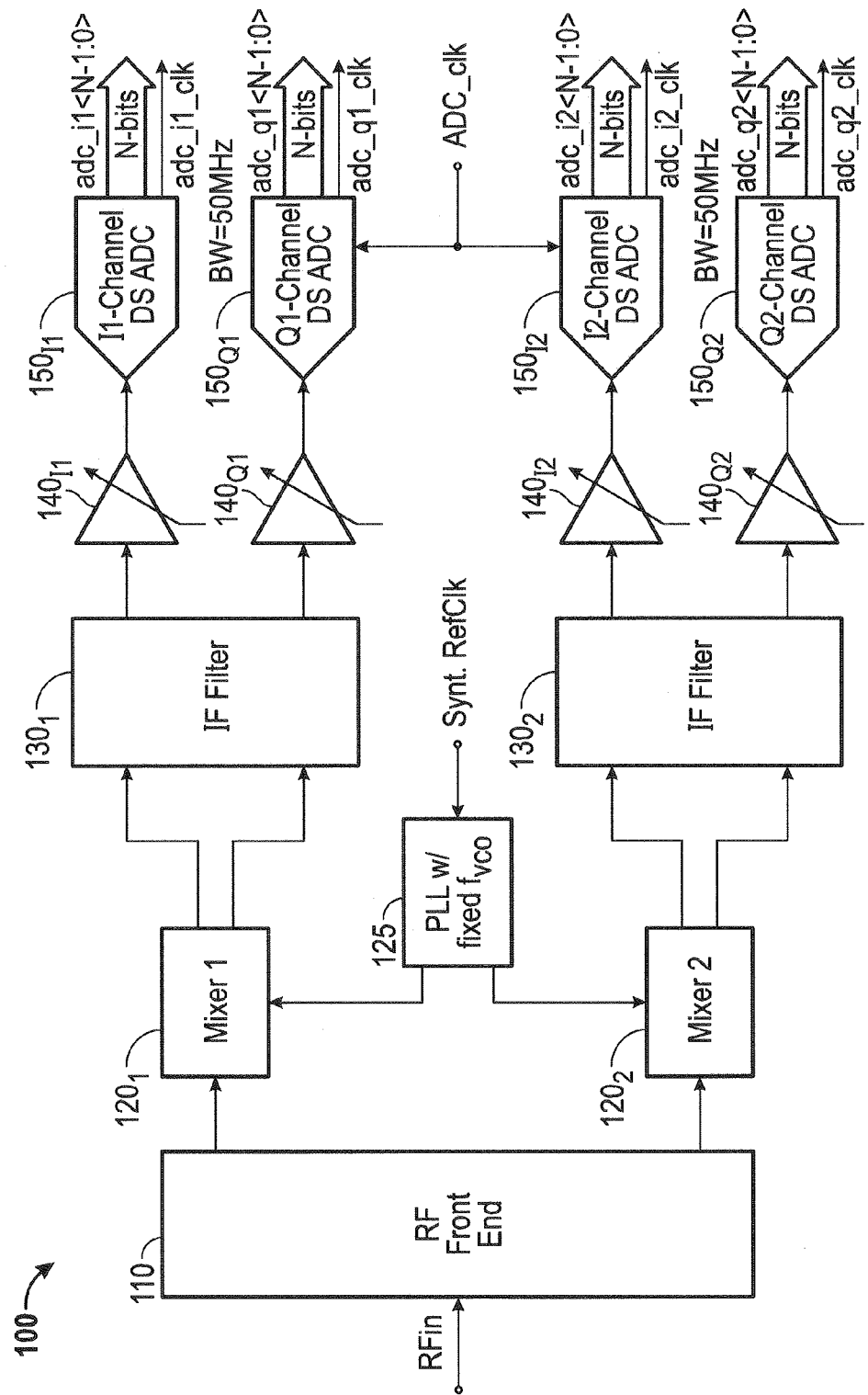
FIG. 1 is a block diagram of a multi-tuner architecture in accordance with an embodiment.

In various embodiments a single chip multi-tuner solution is provided, where in many embodiments multiple tuners can be integrated on a single semiconductor die. Such designs are attractive as it can be more cost and power efficient compared to a solution where multiple single tuners or dual tuner chips are used. Embodiments may also enable reduced area and power per tuner, as more and more tuners are integrated into a single die/multi-chip module (MCM).

In a basic implementation, a multi-tuner chip can be designed by integrating multiple single tuners into a single die whose area and power essentially scales with the number of tuners integrated. In this approach, managing voltage controlled oscillator (VCO)-to-VCO coupling of individual tuners can be a challenge to address.

Generation of local oscillator (LO) clocks based on a single VCO may therefore be implemented in some embodiments. There is, however, a trade-off between the VCO frequency and granularity of LO frequencies that can be generated in a power and cost efficient way. For example, in a given CMOS technology, if integer divider ratios are used, a synthesizer with a 13.6 GHz fixed VCO frequency affords generation of 100 MHz LO granularity. Such 100 MHz LO spacing sets an intermediate frequency (IF) to be anywhere between −50 MHz to 50 MHz. Such wide IF bandwidth may impose very stringent requirements on image rejection, IF ADC dynamic range, linearity, digital downconversion and channel filtering, among other things as will be described below.

Thus other embodiments provide an LO generation scheme based on interpolative dividers so that fractional divide ratios may be generated and thus the trade-off between fixed VCO frequency and LO spacing is: smaller LO spacing for the same VCO frequency implies reduced IF bandwidth. For example, with an 8-level interpolative divider, IF bandwidth can be reduced to 15 MHz from 50 MHz for the same 13.6 GHz VCO frequency. As a result, image rejection and IF dynamic range requirements can be relaxed significantly, and therefore, a smaller lower power LO path and IF chain may be realized. Similar benefits exist in the digital part of the signal chain.

Embodiments are based on a key observation of interpolative dividers: spurs generated by the divider for a given fraction are located at certain frequencies related to the generated LO if the interpolator cycles through the interpolation levels periodically. Once this observation is made, the LO generation circuitry may be designed such that any generated spur is placed in a manageable location. For one implementation of an interpolative divider, for example, the spur is either located at half-LO frequency or not present at all, depending on the divide ratio. When it is present, the spur is sufficiently away from the LO frequency such that one or more tracking filters located prior to a downconversion mixer may provide sufficient attenuation to a blocker located at half-LO for adequate signal reception.

In different implementations, a variety of different tuner arrangements are possible to realize a multi-tuner architecture. While embodiments described herein contemplate incorporation of multiple tuners within a single semiconductor die, understand that other implementations may provide each tuner on a separate die incorporated within a multi-die single integrated circuit (IC) package.

Referring now to FIG. 1, shown is a block diagram of a multi-tuner architecture in accordance with an embodiment. In the embodiment shown in FIG. 1, circuit 100 includes two tuners. Understand that while shown in this example with two tuners for ease of illustration, it is possible that additional tuners may be provided. Multi-tuner 100 includes a single frequency synthesizer 125 having a fixed frequency, namely a fixed VCO frequency, $f_{vco}$.

In the embodiment shown, incoming radio frequency (RF) signals are provided to a RF front end unit 110. In general, front end unit 110 may include various analog circuitry such as one or more amplifiers, e.g., active splitters, low noise amplifiers (LNAs) with programmable gains, one or more filters and so forth. Note that in various embodiments, an active splitter may be provided within the signal processing path, either off-chip prior to front end unit 110 or as part of the front end unit. The resulting processed RF signals are provided in turn to a plurality of mixers $120_1$ and $120_2$. In general, each mixer is configured to downconvert the received RF signal to a different, lower frequency signal. In the example of FIG. 1, mixers $120_1$ and $120_2$ are configured to downconvert the incoming RF signal to intermediate frequency (IF) signals. To this end, each of the mixers further receives a LO2x frequency from a frequency synthesizer 125 followed by an integer-N LO divider (not shown in FIG. 1). In the embodiment shown, synthesizer 125 may be a phase locked loop (PLL) that generates different LO frequency signals from a fixed VCO frequency signal $f_{vco}$ generated from a received reference clock signal.

The resulting IF signal output by mixers $120_1$ and $120_2$, which may be quadrature signals in an embodiment in which the mixers are quadrature mixers, are provided to corresponding real or complex IF filters $130_1$ and $130_2$. The filtered signals may be provided to corresponding programmable gain amplifiers (PGAs) $140_{I1}$-$140_{Q2}$ that in turn provide amplified signals to corresponding analog-to-digital converters (ADCs) $150_{I1}$-$150_{Q2}$. As one such example, each ADC may be a delta-sigma ($\Delta\Sigma$)-based ADC that generates a digitized signal (e.g., an N-bit signal) that may be provided to additional circuitry such as a demodulator or other processing logic of a system (not shown for ease of illustration in FIG. 1).

Note that with the embodiment shown in FIG. 1, since the LO divider ratio is an integer value, the LO frequency difference between two consecutive divider ratios is fvco/2N-fvco/2(N+1). For fvco=13.6 GHz and N=8, 9, 10, . . . , LO frequencies that can be generated are 850 MHz, 755.555 MHz, 680 MHz, . . . and so on. Hence, spacing between two consecutive LO frequencies is at least 94.445 MHz. Therefore, if all possible channels between two LO frequencies are to be covered without changing the VCO frequency, IF stages following the mixers, namely IF filters and ADCs, may be configured with a relatively wide bandwidth, e.g., approximately around 50 megahertz (MHz) for the above example. Due to this relatively high bandwidth, there may be challenges in meeting IF dynamic range requirements and image rejection (IR) requirements. Accordingly, in other embodiments to ease at least certain constraints, a multi-tuner architecture can include, instead of complex IF filters, wideband real low pass filters (LPFs).

Figure 2A:
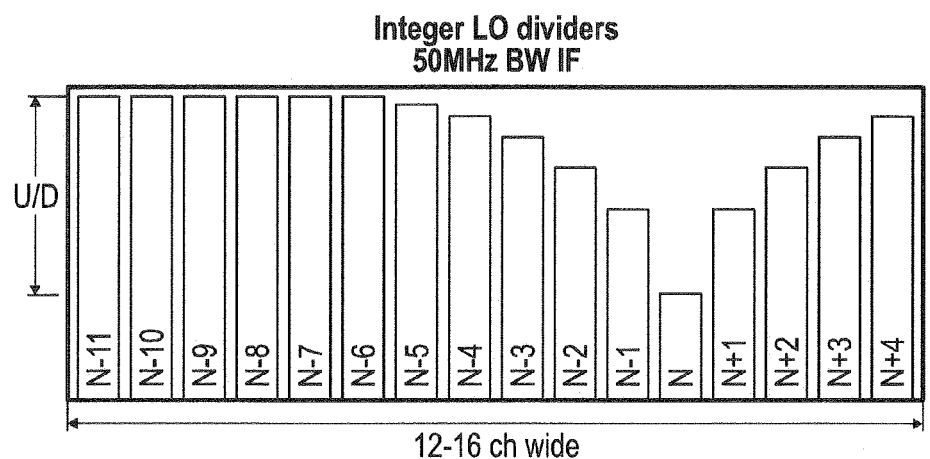
FIGS. 2A and 2B are diagrammatic illustrations of channels present in various bandwidths in accordance with an embodiment.
Figure 2B:
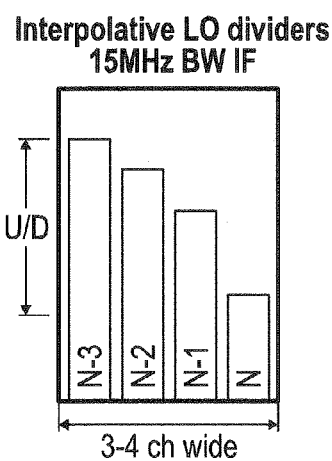

Referring now to FIGS. 2A and 2B, shown are diagrammatic illustrations of channels present in various bandwidths in accordance with an embodiment. As shown in FIG. 2A, when using an IF bandwidth of 50 MHz, the resulting signal processing bandwidth is approximately 100 MHz. As such, 12-16 channels may be present within this band. Assuming a desired channel N, note the presence of relatively large blockers within the same band, leading to a potentially large dynamic range to handle these undesired signals, given the magnitude of the difference between the undesired and desired channels.

In contrast, referring to FIG. 2B, with a narrow bandwidth of the IF signal processing path (approximately 15 MHz instead of 50 MHz), reduced dynamic range requirements exist, as instead the band to be handled may include only 3-4 channels. In an embodiment this leads to reduced dynamic range requirements (e.g., approximately 8 dB lower) and corresponding relaxed IR requirements (e.g., also 8 dB). Furthermore, using such a narrow band architecture, the image rejection engine may calibrate to a smaller bandwidth. As such, these relaxed requirements lead to improved and simplified signal processing.

Figure 3:
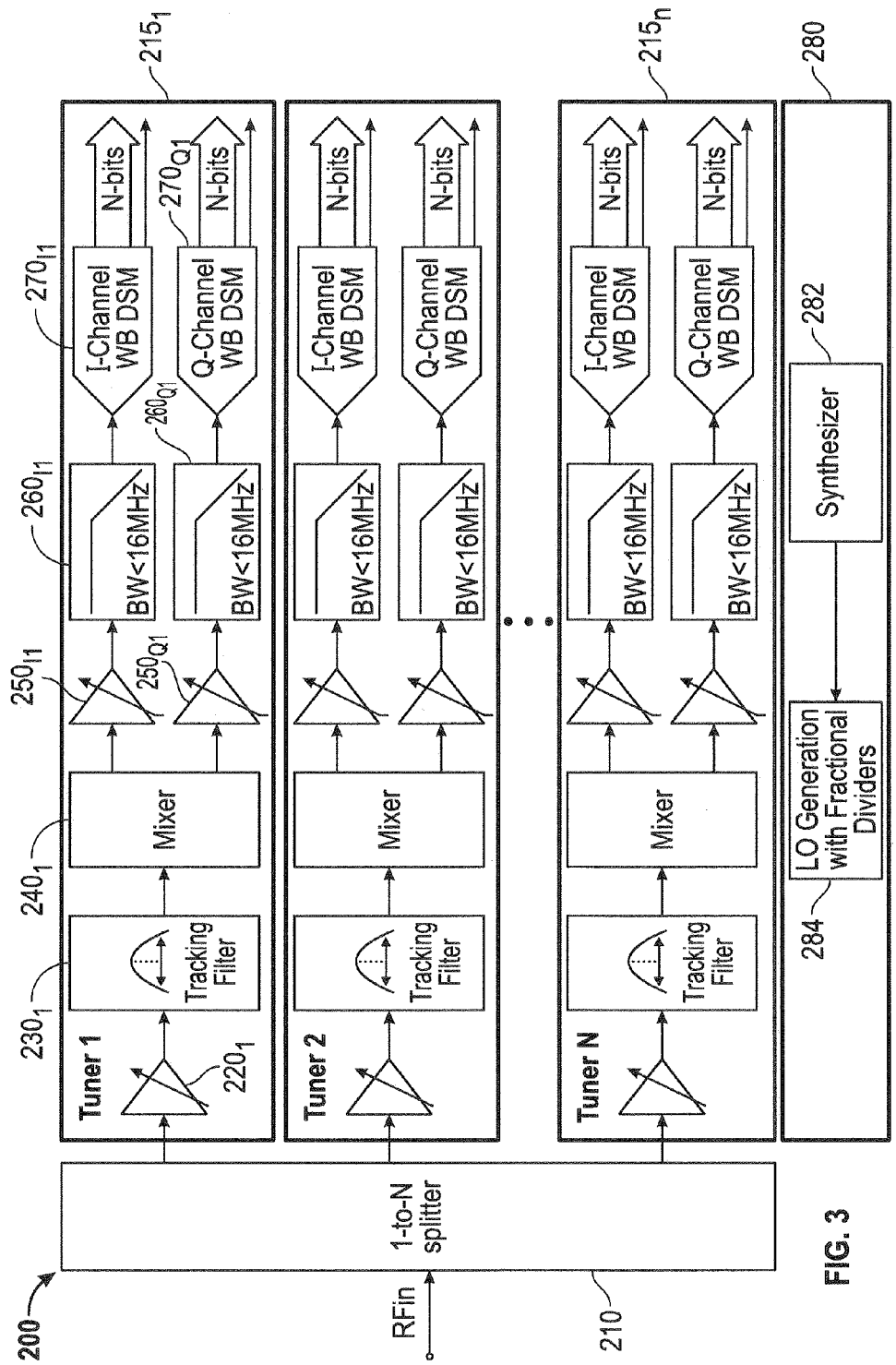
FIG. 3 is a block diagram of a multi-tuner architecture in accordance with yet another embodiment.

Referring now to FIG. 3, shown is a block diagram of a multi-tuner architecture in accordance with yet another embodiment. As shown in FIG. 3, tuner 200 is an N-channel tuner including N different channels $215_1$-$215_n$, each of which is configured to receive and process an incoming RF signal $RF_{IN}$. Note that tuner 200 can be implemented on a single semiconductor die. As seen in FIG. 3, the incoming RF signal is provided to a splitter 210 that splits and provides the signal to each of the different channels. This RF signal may have been previously amplified by a LNA located off-chip, or by an on-chip LNA (not shown in FIG. 3). For purposes of discussion herein, the components of a first channel, channel 1 ($215_1$), are described. Understand each channel may be configured similarly, although operating at a different frequency band.

In the example shown in FIG. 3 as to the signal processing path of channel $215_1$, the RF signal is first provided to a LNA $220_1$. In turn, the amplified signal is provided to a tracking bandpass filter (BPF) $230_1$. The resulting filtered signal is then coupled to a mixer $240_1$ which may be configured as a quadrature mixer to downconvert the RF signal to a lower frequency signal (e.g., an IF signal). As will be described further below mixer $240_1$ is configured to mix the RF signal with an LO signal received from a clock generation circuit 280, which in the embodiment of FIG. 3 includes a single frequency synthesizer 282 and a plurality of interpolative dividers 284 each programmable to generate an LO signal for one or more corresponding channels of the tuner. In addition clock generation circuit 280 includes control circuitry such as a microcontroller unit (MCU) or other control logic (such as spur management logic) (not shown) to calculate divider ratios of the different integer and interpolative dividers based on the RF frequency.

Still with reference to FIG. 3, the lower frequency output from mixer $240_1$ is provided to corresponding PGAs $250_{I1}$-$250_{Q1}$. In turn, amplified signals may be provided to corresponding low pass filters $260_{I1}$-$260_{Q1}$. In an embodiment, the bandwidth of these filters may be less than approximately 16 MHz. The resulting filtered signals in turn may be provided to corresponding digitizers $270_{I1}$-$270_{Q1}$ which in an embodiment can be configured as $\Delta\Sigma$ modulators (DSMs). In an embodiment, these ADCs may operate at a relatively narrow bandwidth, e.g., approximately 15 MHz. By providing a narrow bandwidth ADC, design constraints are relaxed, enabling a smaller and lower power solution than the embodiments discussed above as to FIG. 1. As with the above tuner, the resulting digital outputs from the ADCs may be provided to further circuitry of a system. Although shown at this high level in the embodiment of FIG. 3, understand the scope is not limited in this regard.

Figure 4:
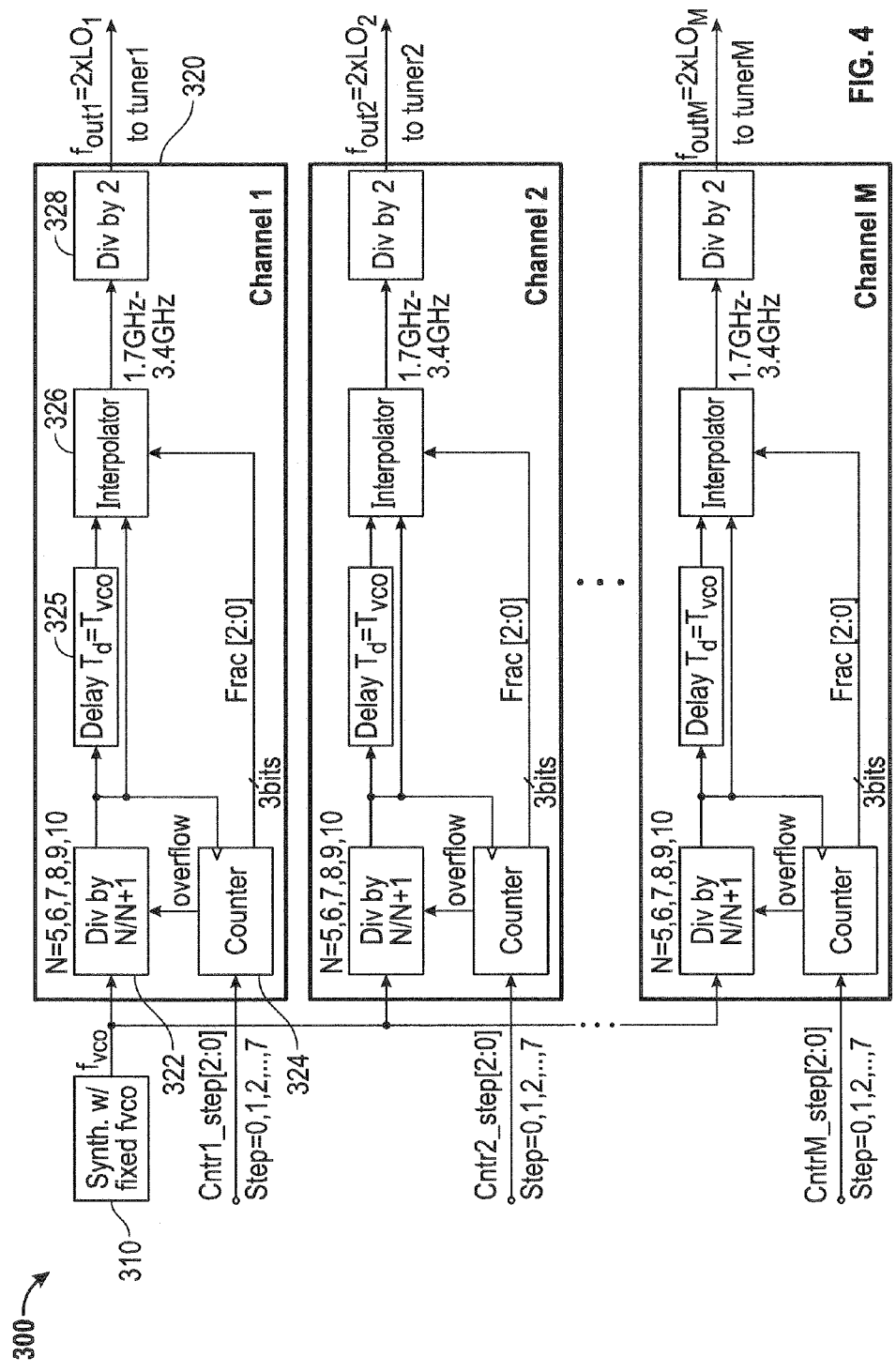
FIG. 4 is a block diagram of an interpolative frequency divider arrangement in accordance with an embodiment.

Referring now to FIG. 4, shown is a block diagram of an interpolative divider arrangement in accordance with an embodiment. As shown in FIG. 4, clock generation circuit 300 includes a frequency synthesizer 310. In an embodiment, the frequency synthesizer may be an on or off-chip frequency synthesizer, such as a crystal oscillator or other frequency generation circuitry. As seen, frequency synthesizer 310 generates a VCO frequency $f_{VCO}$ that is provided to the plurality of channels $320_1$-$320_m$. For purposes of discussion, a single channel $320_1$ of the clock generation circuit is described in detail. Understand that in a particular implementation each such divider may be similarly configured (although programmed with different divide ratios while in operation).

In general, an interpolative divider uses an integer divider for the integer portion of the divider ratio. Then the fractional portion is provided by interpolating one VCO period. So if one wants to divide by 5.375, the edges at the LO output are at 5.375 T, 10.75 T, 16.125 T, 21.5 T, 26.875 T, 32.25 T, 37.625 T, 43 T, where T is one VCO clock period. So the fractional parts provided by the interpolator divider are 0.375 T, 0.75 T, 0.125 T, 0.5 T, 0.875 T, 0.25 T, 0.625 T and 0 and so on. The divider settings on the other hand would be 5 T, 5 T, 6 T (transition between 16.125 T-10.75 T), 5 T, 5 T, 6 T (transition between 26.875 T-32.25 T), 5 T, 6 T (transition between 37.625 T-43 T), and so on. The fractional part may be provided by a counter with a step size of 0.375. And every time the counter overflows, the divider is configured as a divide-by-6 divider.

As seen, the incoming fixed VCO frequency is provided to a divider 322. In various embodiments, this divider may be a controllable or programmable divider that is controlled to divide by N or N+1, where N is a programmable number and represents the integer portion of the LO divider ratio. In a particular embodiment, N may be programmed to be between 5 and 10. In general, divider 322 operates to divide the VCO frequency signal by this value N. However, upon receipt of a control signal (which in an embodiment is an overflow signal) from a counter 324, divider 322 operates to divide the VCO frequency signal by N+1. Thus in operation, a number of divide cycles occur during which the division is by N and one or more divide cycles occur during which the division is by N+1. For example, in every eight cycles there will be k cycles for which the divider is configured as divide-by-(N+1) and (8-k) cycles for which the divider is configured as divide-by-N. Thus the overall divider ratio is N+(k/8), k=0, 1, 2, ..., 7.

Still referring to FIG. 4, counter 324 is configured to count to a value set by a step signal received from the MCU. This step value is based on the given RF frequency. In operation, counter 324 generates a three bit output count value FRAC[2:0]. Note that counter 324 is clocked by the output of divider 322. This output of the divider is further provided to a delay element 325 that has a delay corresponding to a period of the VCO frequency ($T_{vco}$).

The divided VCO frequency signal output by divider 322 and the delayed version from delay element 325 are provided to an interpolator 326, which in an embodiment may be a multi-level phase interpolator that interpolates between these two clock pulse edges to generate an interpolated output signal. This interpolated output signal in turn is provided to another divider, namely a divide by two divider 328, in the embodiment of FIG. 4.

This resulting LO frequency signal is provided to the corresponding mixer of the given channel to thus enable the received RF signal to be downconverted to a given (e.g., IF) frequency based on this LO frequency signal. Although shown at this high level in the embodiment of FIG. 4, understand that other implementations are possible.

Figure 5:
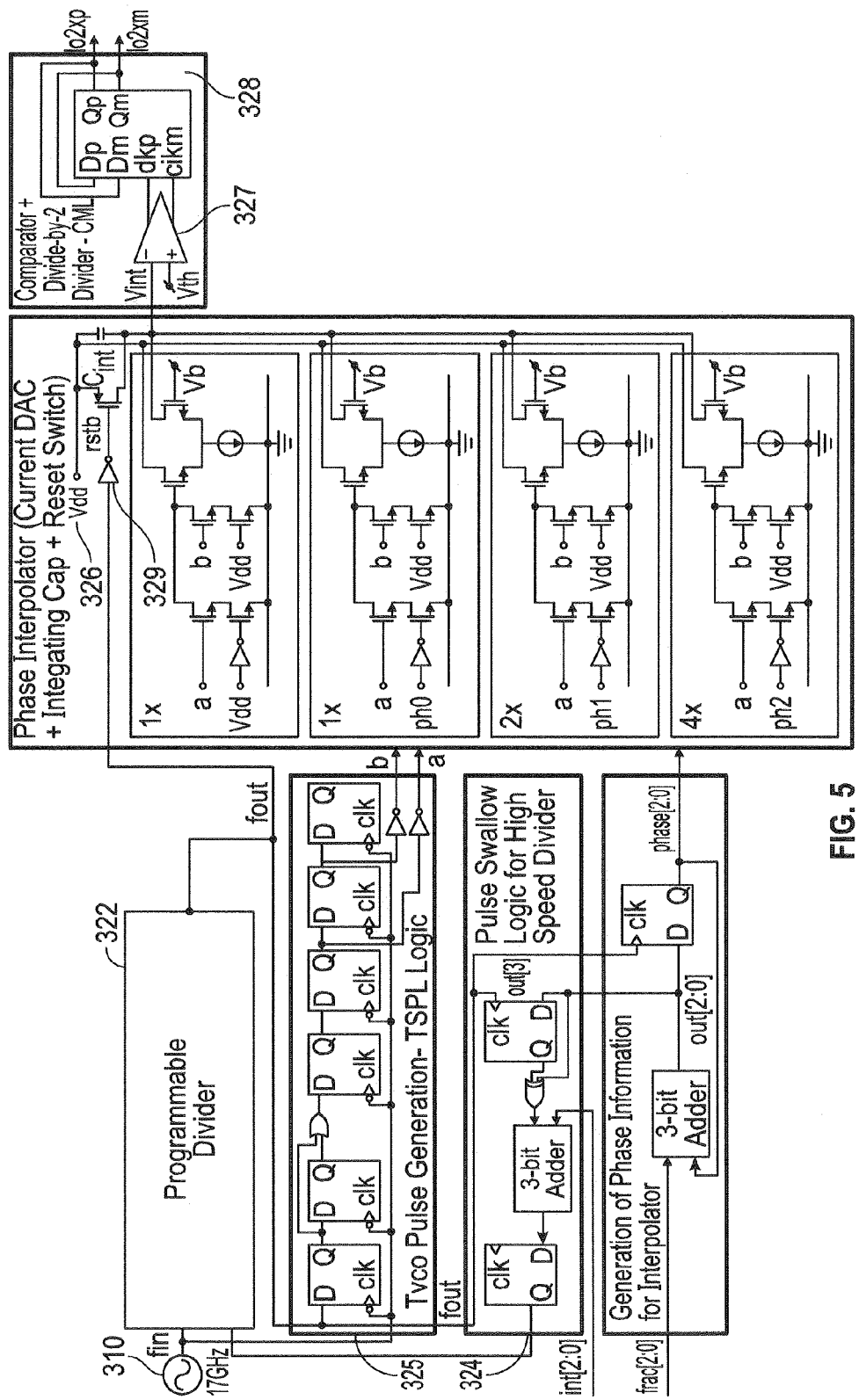
FIG. 5 is a schematic diagram of an interpolative frequency divider in accordance with one embodiment.

Referring now to FIG. 5, shown is a schematic diagram of an interpolative frequency divider in accordance with one embodiment. In the embodiment shown in FIG. 5, divider 320 is configured to receive a VCO frequency from a synthesizer 310. More specifically, a divider 322 may include a plurality of programmable dividers to generate a desired number N for the frequency divider. In turn, the resulting divided VCO frequency signal is provided to a delay element 325 and a phase interpolator 326.

As seen, phase interpolator 326 includes a plurality of current DACs, each of which is of a particular weighted value. In various embodiments, phase interpolator 326 is implemented using binary-weighted DACs as part of integrators. In a particular embodiment, a 16-level interpolator may be provided. However, for most operation scenarios, this interpolator is configured to operate as an 8-level interpolator.

As seen, the current DACs couple to an integrating capacitor $C_{int}$ having a voltage controlled by a reset switch (triggered by an output of an inverter 329), that is controlled by the divided VCO frequency signal output from divider 322. In turn, each of the current DACs receives a pair of clock pulses A and B via delay element 325 and a phase count value from counter 324, which acts as a control input. Note that these clock pulses A and B have a delay with respect to each other of one period of the reference clock signal. Stated another way, clock pulse B trails clock pulse A by a single period of the reference clock signal fin. Thus phase interpolator 326 interpolates between these two clock edges. There are two integrating phases in the interpolator. In the first phase, the integrating capacitor is charged with a current provided by the DAC depending on the DAC input word for a duration equal to one period of the reference clock. Then during the second phase, the DAC provides the full scale current. Once the voltage across the integrating capacitor reaches the threshold value, then the voltage across the capacitor is reset to make it ready for the next interpolation. Thus, the interpolation ratio is determined by the amount of current provided by the current DAC during the first integrating phase, as seen in FIG. 5. Note that the current DACs of phase interpolator 326 integrate charge with a fractional current to realize the voltage stored in the integrating capacitor. In an embodiment having an 8-level phase interpolator, a pair of 1× current DACs, a single 2× current DAC, and a 4×DAC may be provided. The resulting voltage stored in capacitor $C_{int}$ is compared to a threshold voltage in a comparator 327, the output of which clocks an additional divider 328, namely a divide by two divider in order to remove the edge, which is not interpolated.

Figure 6:
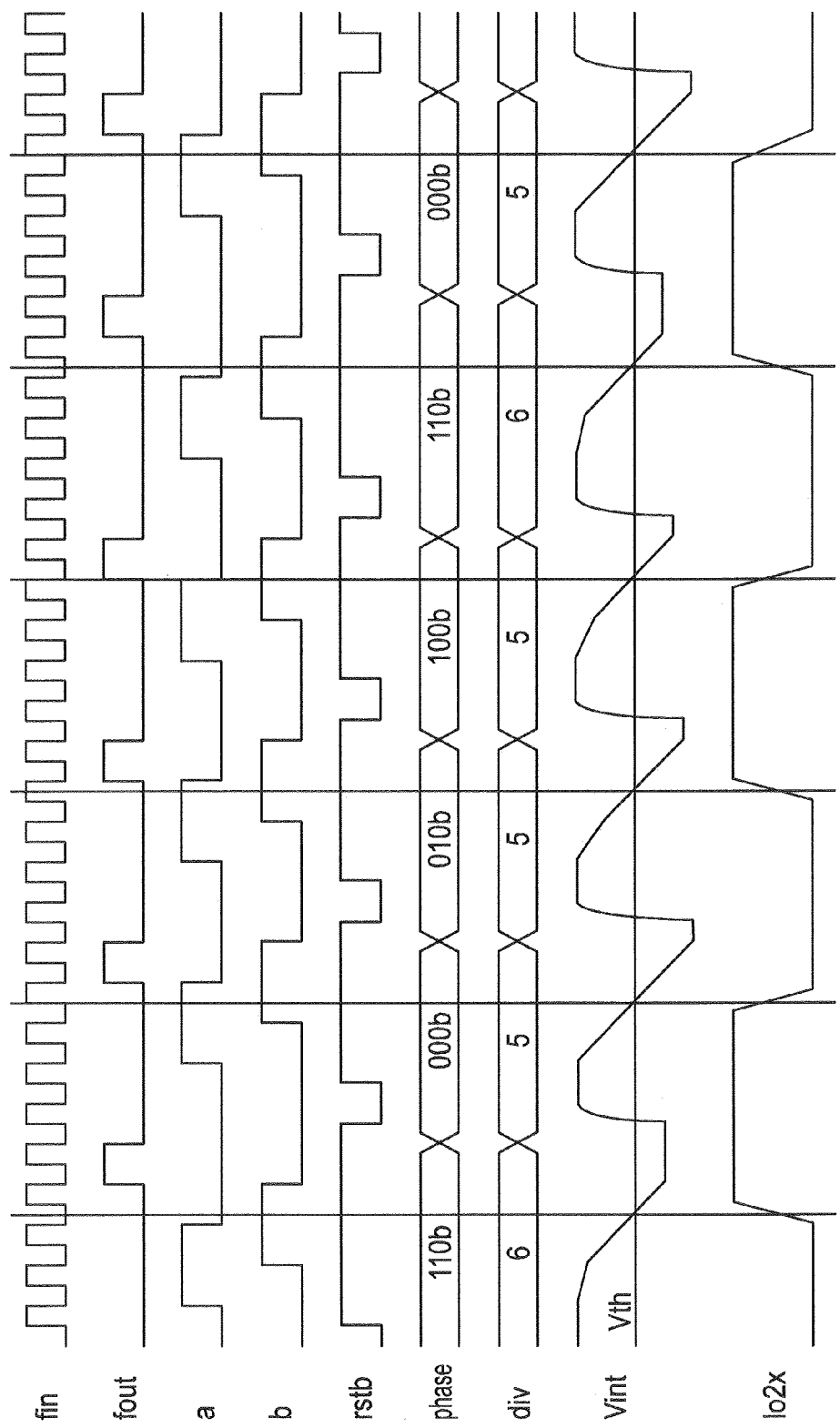
FIG. 6 is a timing diagram illustrating generation of a local oscillator signal using an interpolative divider in accordance with an embodiment.

Referring now to FIG. 6, shown is a timing diagram, illustrating generation of a LO signal using an interpolative divider in accordance with an embodiment. As shown in FIG. 6, a LO signal (lo2x, which is the output of divider 328 of FIG. 5) results from an incoming reference clock signal (fin), which in the illustration of FIG. 5 is a 17 GHz reference clock signal.

The illustration shown in FIG. 6 is of operations performed to realize a divide by 5.25 operation. Because an integer-based divider cannot perform fractional divisions, an interpolative divider as in FIG. 5 can realize the desired divide by ratio. As seen, the output of divider 322 is of a variable ratio. Namely, the divide by ratio varies from 5 to 6 in a manner such that the resulting interpolated value meets the desired divide by ratio of 5.25.

Note that the clock pulse signals from delay element 325 (a and b) are provided as inputs into phase interpolator 326, as is the divided frequency signal $f_{out}$. In phase interpolator 326, this signal is inverted and delayed to generate a reset signal provided to a reset switch of the phase interpolator. In turn, the control of the divide by ratio is by input of a phase control signal that in turn is propagated to control the weightings of the current DACs of phase interpolator 326. The outputs of the individual current DACs are summed to generate an integrating voltage ($V_{int}$) via the integrating capacitor of phase interpolator 326.

Then this integrating voltage is compared to a threshold voltage ($V_{th}$) in comparator 327 to thus generate a comparison output that in turn clocks divider 328, generating the realized LO signal. Although shown with this particular example, understand that different examples and different values can be used to accommodate other divide ratios.

Note that it is possible for phase spurs to be introduced in interpolative dividers because of interpolator DAC integral nonlinearity (INL) due to DAC unit cell mismatch currents and mismatches in the block path that controls the switching of DAC cells. However, one can show that generated spurs are always at the harmonics of $M/8*fvco/(N+M/8)=M*LO/2$. Here it is assumed that there are two divide by two dividers following the interpolator, one immediately following the interpolator to remove the non-interpolated edges, and another divider in the mixer, such that the LO signal is LO= (fvco/(N+M/8))/4.

At UHF frequencies, the spurs are located at half the LO frequencies for M=1, 3, 5, 7. A tracking filter in the receiver signal processing path for UHF channels provides at least 20 dB attenuation for blockers at ½ of the LO frequency. For frequencies below UHF, the receiver may switch to an N-phase mixer (where N is an even number selected from 8-12-16-20-24, where the spurs disappear owing to the presence of extra divide-by-2 dividers.

Thus the interpolative divider operates such that division is by a first integer ratio for some number of reference clock signals (corresponding to a given number of divider cycles), and then division is by a second integer ratio for a different number of reference clock signals (for a single divider cycle). The result is thus an interpolation of one period of the reference clock signal to obtain a desired output clock signal, which may be a divide by a fractional amount. Note that the interpolator enables edge transitions to occur at a fractional ratio of the reference period, when necessary. Otherwise, a divider whose divider value is changed between N and N+1 for a certain number of reference cycles would still implement a fractional divider, but the output would have many spurs, as many of the edges would not be at the right instant.

In an embodiment, the interpolative divider may be of low resolution such that design constraints are relaxed and a low power low complexity divider is realized. Although the scope is not limited in this regard, in an embodiment an 8-level interpolator may be provided. Also, the resolution may be kept low to prevent spurs from being closer the LO carrier. For example, switching to a 16-level interpolator would cause the spurs to be located at $M/16*fvco/(N+M/16)=M*LO/4$, which would cause the spurs for UHF channels to move closer to LO (at LO/4 offset for M=1). This would then degrade the undesired-to-desired signal power ratio (U/D) performance at LO/4 offset frequencies since tracking filters would provide less attenuation for the blocker. However, as discussed further below, to handle receipt of certain analog signals, a 16-level interpolator (which is still of relatively low power and low complexity) is provided. However, for receipt and processing of digital signals and receipt and processing of many analog signals, the 16-level interpolator can be configured to operate as an 8-level interpolator.

Furthermore, by using an interpolative divider in accordance with an embodiment, for a given desired channel of reception, a fixed divide ratio is established. That is, although the interpolative divider performs a series of multiple divide by N operations and a series of multiple divide by N+1 operation, the resulting output is of a fixed divide ratio.

And, any spur that is generated due to the interpolative divider operation is placed in a specific location that may be very far away from a frequency of interest. For example, as described herein embodiments enable location of a LO spur to be outside a frequency band of interest (far away from a channel of interest) and far away from a given LO frequency. For example, as described herein for interpolative divider ratios that even generate a spur, the spur location can be from 200-400 MHz away from a desired frequency channel and as such, the impact of these spurs can be easily managed with the blocker attenuation provided by tracking filters owing to the far proximity of the spurs to LO carrier. That is, in various embodiments rather than spreading noise energy due to constant changing of divide ratios, here a fixed divide ratio for a given desired channel is provided such that the spur generated in the interpolative divider is located at a specific and known frequency location, which is far away from the desired signal channel. Such spur does not degrade the tuner's blocker handling capability owing to the far proximity of its location with respect to the LO carrier.

Note that the only time that the fixed divide ratio for a given interpolative divider is changed is on a change to a desired channel, such as when a user selects a new television channel for tuning.

To keep divider spurs away from LO carrier, the interpolation levels are a minimized number. An 8-level interpolator provides divider ratios of 2×2×(5, 5.125, 5.250, etc.). So the effective total divider values become 20, 20.5, 21, 21.5, and so forth.

Referring now to Table 1, shown is an example list of LO divider settings for a single frequency synthesizer multi-tuner architecture in accordance with an embodiment. As seen, various interpolative divider ratios are provided for a given reference clock signal (corresponding to a VCO frequency).

In turn, a total divide ratio N is realized by way of the internal divide by 2 divider at the end of the interpolative divider and an additional divide by 2 divider coupled to an output of the interpolative divider. As seen in Table 1, only those interpolative divider ratios having 1/8 value settings generate LO spurs. And note that these LO spurs are at a known location of LO/2 such that the spurs do not degrade the tuner's blocker handling capability owing to the far proximity of its location with respect to the LO carrier.

TABLE 1

| $F_{vco}$ (GHz) | Int. Div. Ratio | Total divN | $F_{min}$ (MHz) | Fcenter (MHz) | Fmax (MHz) | LO spur location (MHz) |
|---|---|---|---|---|---|---|
| 17 | 5 | 20 | 835.0 | 850.0 | 865.0 | |
| 17 | 5.125 | 20.5 | 814.3 | 829.3 | 844.3 | 414.6 |
| 17 | 5.25 | 21 | 794.5 | 809.5 | 824.5 | |
| 17 | 5.37 | 21.5 | 775.7 | 790.7 | 805.7 | 395.3 |
| 17 | 5.5 | 22 | 757.7 | 772.7 | 787.7 | |
| 17 | 5.625 | 22.5 | 740.6 | 755.6 | 770.6 | 377.8 |
| 17 | 5.75 | 23 | 724.1 | 739.1 | 754.1 | |
| 17 | 5.875 | 23.5 | 708.4 | 723.4 | 738.4 | 361.7 |
| 17 | 6.125 | 24.5 | 678.9 | 693.9 | 708.9 | |
| 17 | 6.375 | 25.5 | 651.7 | 666.7 | 681.7 | 333.3 |
| 17 | 6.625 | 26.5 | 626.5 | 641.5 | 656.5 | |
| 17 | 6.875 | 27.5 | 603.2 | 618.2 | 633.2 | 309.1 |
| 17 | 7.125 | 28.5 | 581.5 | 596.5 | 611.5 | 298.2 |
| 17 | 7.5 | 30 | 551.7 | 566.7 | 581.7 | |
| 17 | 7.875 | 31.5 | 524.7 | 539.7 | 554.7 | 269.8 |
| 17 | 8.25 | 33 | 500.2 | 515.2 | 530.2 | |
| 17 | 8.75 | 35 | 470.7 | 485.7 | 500.7 | |

For an 8-step interpolative divider with a 17 GHz VCO as the frequency synthesizer, the highest LO step ($LO_{step}$) is approximately 20 MHz. Maximum bandwidth of a TV channel ($BW_{ch}$) is 8 MHz. This maximum IF bandwidth ($BW_{IF}$) is used if the desired channel center frequency falls $LO_{step}/2$ away from the set LO location:

$$BW_{IF} = \frac{LO_{step} + BW_{ch}}{2} + BW_{margin},$$

where $BW_{margin}$ is an additional margin allocated to the IF bandwidth. With 1 MHz margin and given LO step and channel bandwidth, the required IF bandwidth is 15 MHz.

By providing a multi-tuner architecture with a single frequency synthesizer, the total area and power consumption can be greatly reduced, and furthermore, coupling between multiple VCOs is avoided. Note that in particular implementations, a frequency synthesizer can consume up to half of a total area of a tuner. As such, by providing a single frequency synthesizer, area of a single die multi-tuner can be greatly reduced.

Note that embodiments can be used in various types of receivers including terrestrial receivers configured to receive both analog and digital signals. When configured for reception of analog signals, it is possible that after downconversion to IF, a desired channel may fall very close to DC. For example, assume that an interpolative divider is configured to generate an LO frequency of 850 MHz, and the desired channel is at or around 850 MHz. Thus after downconversion this desired channel may be substantially at or around DC, which may cause problems for purposes of analog reception. Note that in other respects, the interpolative divider may be configured the same and can handle both 8-level and 16-level cases. Note further that for the 16-level case, the counter may be configured as a 4-bit counter rather than a 3-bit counter.

To avoid this situation, embodiments may be configured to cause the LO frequency to be one LO step higher or lower than the otherwise appropriate LO frequency. In this case, the IF bandwidth configured at 15 MHz may be increased, e.g., to 25 MHz to ensure that the downconverted signal still includes the desired signal channel. However, by increasing the LO frequency, more stringent requirements for IF dynamic range and image rejection may occur.

Thus in other embodiments, when the tuner is configured for analog reception and when the desired analog channel falls substantially around DC, the number of interpolation levels may be increased. As described above, in an embodiment a 16-level interpolator may be provided. For such analog channels substantially falling around a DC, this results in half the LO spacing of the 8-level interpolation cases described above and LO frequency can be shifted by ½ LO step higher or lower, causing the down-converted analog channel to move away from DC. In these cases, even where the LO frequency is set to be ½ step higher or lower, the maximum IF frequency bandwidth requirements do not increase.

Furthermore to reduce noise inherent in the interpolative dividers, each interpolative divider may be isolated, e.g., via incorporation of appropriate isolation barriers configured on the semiconductor die.

Figure 7:
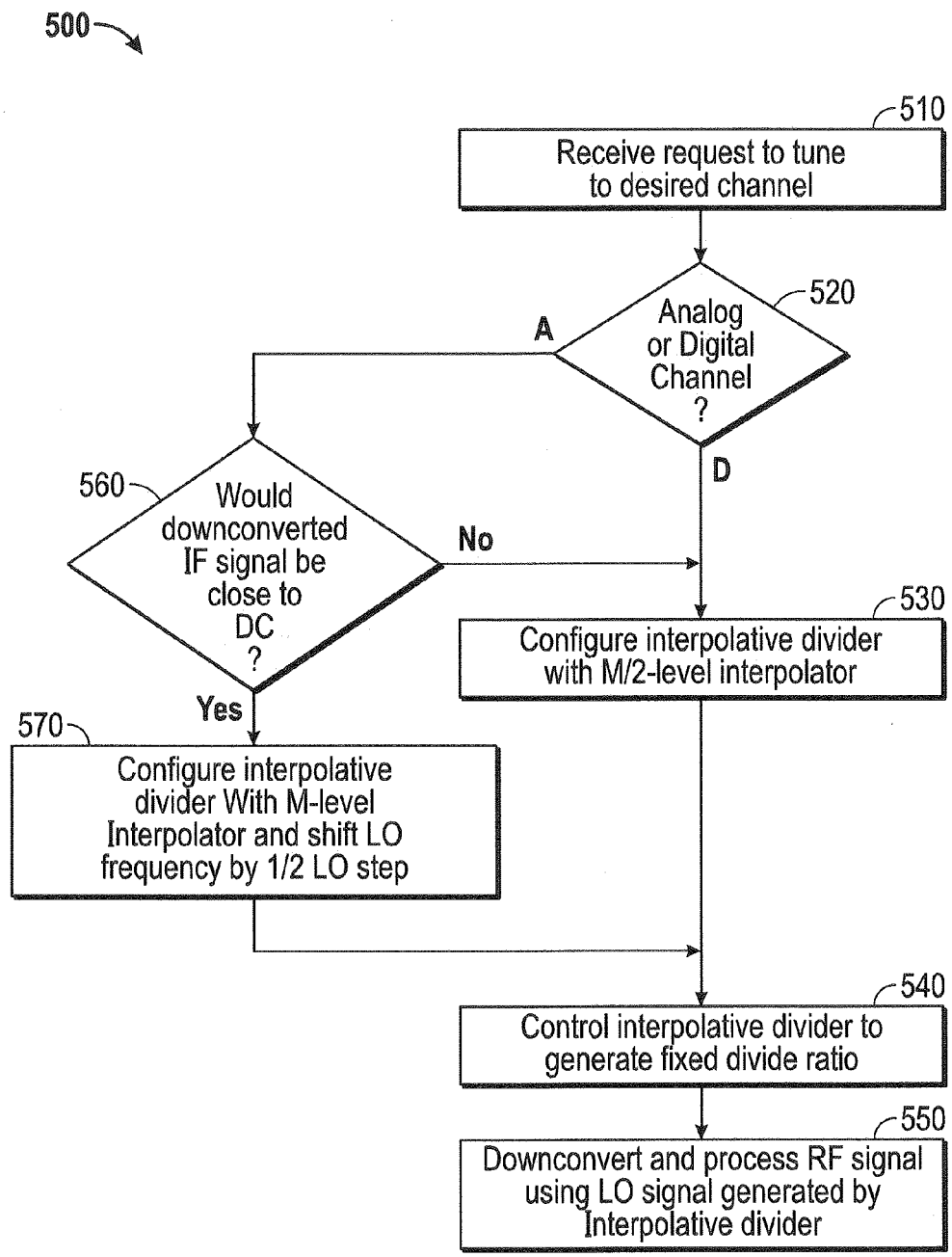
FIG. 7 is a flow diagram of a method of operating a multi-tuner architecture in accordance with an embodiment.

Referring now to FIG. 7, shown is a flow diagram of a method of operating a multi-tuner architecture in accordance with an embodiment. As shown in FIG. 7, method 500 can be performed in a controller such as a microcontroller that may be included within or coupled to clock generation circuitry of the multi-tuner. As seen, method 500 begins by receiving an incoming request to tune to a desired channel (block 510). This request may be responsive to a user input to tune to a desired channel, either for viewing or for recording and storage of a program in a DVR or other storage device. The requested channel may be an analog channel or a digital channel and thus at diamond 520 it is determined the type of channel. If it is a digital channel, control passes to block 530 where the interpolator of the appropriate interpolative divider can be configured as an M/2 level interpolator. For example in an embodiment in which a 16-level interpolator is present, to keep spurs due to interpolative dividers as far away as possible from the LO carrier, the interpolator can be configured as an 8-level interpolator.

Control next passes to block 540 where the interpolative divider can be controlled to generate a fixed divide ratio (block 540). For example, depending upon the frequency of the desired channel, an appropriate LO signal is generated using the interpolative divider set for a fixed divide ratio. More specifically, interpolative divider can be set for a fixed ratio to enable the resulting LO signal to be used to downconvert the incoming signal to an appropriate IF frequency, which may be in a band that is near DC (e.g., within about 15 MHz). As further illustrated in FIG. 7, additional processing after this downconversion can be performed to thus obtain a digital signal that can be sent for further processing such as demodulation and so forth.

Instead when the desired channel is an analog signal, control passes to diamond 560 to determine whether the downconverted IF signal would fall around DC. This situation occurs when a given signal channel would be mixed with a LO signal that causes the downconverted signal to be substantially at DC. If so, control passes to block 570 where the interpolative divider can be configured as an M-level interpolator and having an LO frequency shifted higher or lower by ½ LO step. This shifting relocates the IF downconverted signal away from DC but still within the IF bandwidth, which is 15 MHz. In the implementation described above, a 16-level interpolation is performed. In general in other aspects, processing of this analog signal occurs as described above. Note that the method of FIG. 7 can be performed in various locations within a tuner such as MCU or other control logic, either within the clock generation circuitry or coupled thereto. And of course although shown in this particular implementation, understand that other alternatives are possible.

Embodiments thus provide a cost and power efficient multi-tuner solution for terrestrial and cable TV reception that can address LO generation and IF chain design tradeoffs, while eliminating VCO-to-VCO coupling issues of a multiple synthesizer solution. That is, with multiple VCOs, each of which includes an inductor, interference with other inductors may be created. Instead here, interpolative dividers can be fully implemented in CMOS circuitry without the need for inductors or other VCO components.

Figure 8:
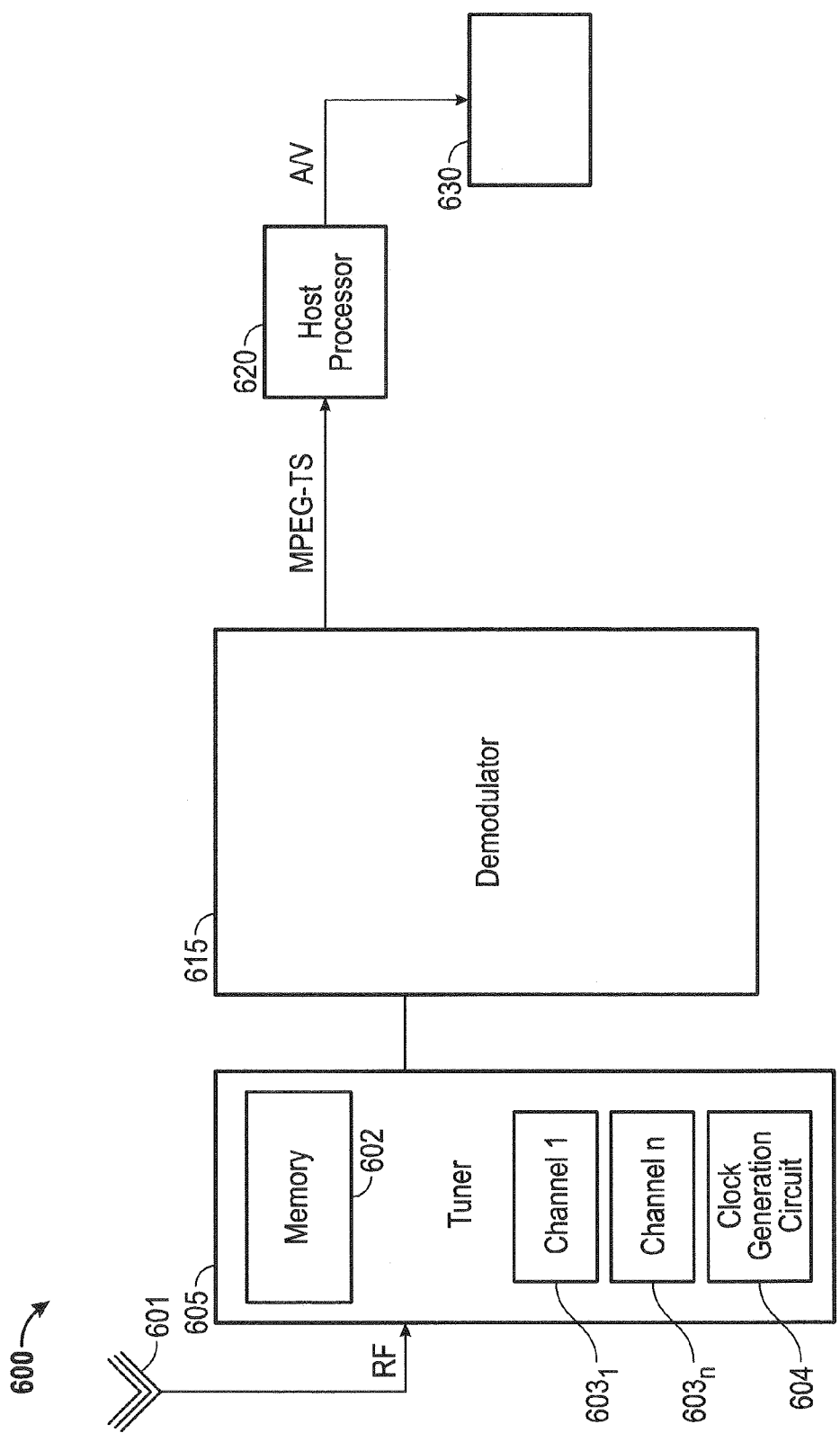
FIG. 8 is a block diagram of a system in accordance with one embodiment.

Embodiments may be implemented in many different system types, such as set-top boxes, high definition or standard digital televisions, and so forth. Some applications may be implemented in a mixed signal circuit that includes both analog and digital circuitry. Referring now to FIG. 8, shown is a block diagram of a system in accordance with one embodiment. As shown in FIG. 8, system 600 may include a television that is coupled to receive a RF signal from an antenna source 601 such as an over-the-air antenna. However, in other embodiments, the original source may be cable distribution, satellite, or other source that is then redistributed through a digital terrestrial network. The incoming RF signal may be provided to a tuner 605 which may be, in one embodiment a single-chip tuner including a plurality of tuners as described herein. As seen, tuner 605 may include a memory 602 to store executable instructions and a plurality of tuner channels $603_1$-$n$, each of which may include various analog front end circuitry and a narrowband ADC. As further seen, tuner 605 also includes a clock generation circuit 604 including a single frequency synthesizer and a plurality of interpolative dividers as described herein.

The incoming RF signal is thus provided to tuner 605 for tuning to one or more desired signal channels. Tuner channels may include various circuitry. For example, in one embodiment each channel 603 may include an amplifier having an output coupled to a bandpass filter. In turn the filtered output of this bandpass filter is coupled to a mixer. In turn, the mixer downconverts the incoming RF signal to an IF output, which may be further processed (e.g., amplified and filtered) via a signal processing path, and finally digitized in a narrowband ADC.

Referring still to FIG. 8, the digitized output of these ADCs of tuner 605 may be provided to additional processing circuitry including a demodulator circuit 615, which may demodulate the incoming digitized signals. The output of demodulator 615 may correspond to a transport stream such as an MPEG-TS that is provided to a host processor 620 for further processing into an audio visual signal that may be provided to a display 630, such as a computer monitor, flat panel television or other such display.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a splitter to receive a radio frequency (RF) signal and to provide the RF signal to a plurality of channels, wherein each of the plurality of channels comprises:
a first amplifier to amplify the RF signal;
a mixer to downconvert the amplified RF signal to a second frequency signal using a local oscillator (LO) signal, each of the plurality of channels configured to receive a different LO signal;
a first filter to filter the downconverted second frequency signal;
a digitizer to digitize the downconverted second frequency signal; and
a clock generation circuit including a frequency synthesizer to generate a reference clock signal and a plurality of interpolative dividers, each of the plurality of interpolative dividers to receive the reference clock signal and to generate a corresponding LO signal therefrom and to provide the corresponding LO signal to the mixer of at least one of the plurality of channels.

2. The apparatus of claim 1, wherein the apparatus comprises a multi-tuner circuit configured on a single semiconductor die.

3. The apparatus of claim 1, wherein the clock generation circuit comprises a controller coupled to the interpolative divider, wherein the controller is to control a value of the LO signal output by the interpolative divider to cause downconversion of the amplified RF signal to a narrowband signal substantially around DC, wherein a resolution of the interpolative divider is limited to cause spurs generated in the interpolative divider to be maintained away from the LO signal.

4. The apparatus of claim 1, wherein responsive to the RF signal, the clock generation circuit is to configure a first interpolative divider to operate at a fixed divide ratio.

5. The apparatus of claim 1, wherein each of the plurality of channels further comprises a second filter coupled between the first amplifier and the mixer.

6. The apparatus of claim 5, wherein each of the plurality of channels further comprises a second amplifier coupled between the mixer and the first filter.

7. The apparatus of claim 6, wherein the second filter comprises a tracking bandpass filter and the first filter comprises a low pass filter.

8. The apparatus of claim 1, wherein the digitizer comprises a narrow band lowpass delta-sigma modulator.

9. The apparatus of claim 1, wherein the interpolative divider comprises:
a controllable divider to receive the reference clock signal and to generate a divided signal;
a delay element to receive the divided clock signal and to provide a delayed divided clock signal;
an interpolator to receive the divided clock signal and the delayed divided clock signal and to interpolate the divided clock signal and the delayed divided clock signal into a third frequency signal; and
a second divider to divide the third frequency signal to obtain a LO2x signal.

10. The apparatus of claim 9, wherein the interpolative divider further includes a counter to be clocked by the divided clock signal, and to generate to a control signal to be provided to the controllable divider, wherein the control signal is to cause the controllable divider to change a divide ratio from N to N+1.

11. The apparatus of claim 9, wherein the interpolator comprises:

a plurality of current digital-to-analog converters (DACs); and a capacitor to integrate an output of the plurality of current DAC circuits.

12. The apparatus of claim 11, wherein the second divider comprises:
    a comparator to compare an integrating voltage of the capacitor to a threshold voltage; and
    a second delay element clocked by an output of the comparator.

13. The apparatus of claim 1, wherein responsive to a user request for a first analog channel, at least one of the interpolative dividers is to operate as a M-level interpolator when the downconverted second frequency signal falls substantially around DC, and responsive to a user request for a digital channel, the at least one interpolative divider is configured to operate as a M/2-level interpolator.

14. A system comprising:
    an integrated circuit (IC) multi-tuner circuit having a first semiconductor die including a first tuner to receive and process a radio frequency (RF) signal to output a first digitized signal and a second tuner to receive and process the RF signal to output a second digitized signal;
    a clock generation circuit including a single frequency synthesizer to generate a reference clock signal and a plurality of interpolative dividers each including an interpolator having M-levels of resolution, each of the plurality of interpolative dividers to receive the reference clock signal and to generate a corresponding LO signal therefrom according to a fixed divide ratio and to provide the corresponding LO signal to one of the first and second tuners, wherein the corresponding interpolator is configured to operate as a M/2-level interpolator when a desired channel is a digital channel and as a M-level interpolator when the desired channel is an analog channel; and
    a demodulator coupled to receive and demodulate the first and second digitized signals.

15. The system of claim 14, wherein the first tuner further comprises:

a first amplifier to amplify the RF signal;
    a mixer to downconvert the amplified RF signal to a second frequency signal using the corresponding LO signal;
    a first filter to filter the downconverted second frequency signal; and
    a digitizer to digitize the downconverted second frequency signal.

16. The system of claim 15, wherein the clock generation circuit comprises a controller coupled to the plurality of interpolative dividers, wherein the controller is to control a value of the LO signal output by a first interpolative divider to cause downconversion of the amplified RF signal to a narrowband signal substantially around DC, wherein a resolution of the interpolative divider is limited to cause spurs generated in the interpolative divider to be maintained away from the LO signal.

17. A method comprising:
    configuring an interpolative divider of a clock generation circuit of a television tuner integrated on a single semiconductor die as a M/2-level interpolator responsive to a request to tune to a desired channel corresponding to a digital channel;
    controlling the interpolative divider to generate a local oscillator (LO) signal from a reference clock signal according to a fixed divide ratio and providing the LO signal to a first tuner of a plurality of tuners of the television tuner; and
    downconverting and processing the RF signal in the first tuner using the LO signal.

18. The method of claim 17, further comprising configuring the interpolative divider as a M-level interpolator responsive to a request to tune to a second desired channel corresponding to an analog channel.

19. The method of claim 18, further comprising determining if a downconverted signal from the analog channel would be substantially around DC, and if so, configuring the interpolative divider as the M-level interpolator.

20. The method of claim 19, further comprising otherwise configuring the interpolative divider as the M/2-level interpolator.

* * * * *